United States Patent [19]

Slavin et al.

[11] Patent Number: 4,567,910

[45] Date of Patent: Feb. 4, 1986

[54] VACUUM REGULATOR

[75] Inventors: Michael Slavin, Troy; Robert P. Fontecchio, Rochester, both of Mich.

[73] Assignee: Lectron Products, Inc., Rochester, Mich.

[21] Appl. No.: 674,937

[22] Filed: Nov. 26, 1984

[51] Int. Cl.⁴ .............................................. F16K 31/06

[52] U.S. Cl. ........................................ 137/82; 55/502; 55/509; 137/549; 137/907; 251/129.21; 251/129.15

[58] Field of Search ................. 55/501, 502, 503, 509; 123/571; 137/82, 544, 549, 625.65, DIG. 8; 251/139, 141

[56] References Cited

U.S. PATENT DOCUMENTS

| | | | |
|---|---|---|---|
| 3,459,404 | 8/1969 | Wisniewski | 137/625.65 X |
| 4,005,733 | 2/1977 | Riddel | 251/141 X |
| 4,211,257 | 7/1980 | Sakakibara et al. | 251/139 X |
| 4,292,060 | 9/1981 | Sakakibara et al. | 55/503 X |
| 4,299,374 | 11/1981 | Yamanaka | 251/139 X |
| 4,520,227 | 5/1985 | Krimmer et al. | 251/141 X |
| 4,522,371 | 6/1985 | Fox et al. | 137/DIG. 8 X |
| 4,524,948 | 6/1985 | Hall | 251/141 X |

OTHER PUBLICATIONS

Article entitled "EGR Controlled Electronically" on p. 46 of the Oct. 1984 issue of Automotive Engineering.

*Primary Examiner*—Gerald A. Michalsky
*Attorney, Agent, or Firm*—Harness, Dickey & Pierce

[57] ABSTRACT

A vacuum regulator for automotive vehicles of the type having an engine exhaust system and a computer-controlled exhaust gas recirculation system, the regulator having a housing provided with a pair of spaced outlets intercommunicating through a flow restrictive orifice and adapted to be connected to the engine exhaust system and to the exhaust gas recirculation system, respectively; an inlet for atmospheric air connected by a passageway to the outlets; and a solenoid-operated spring-biased valve in the housing controlling flow of atmospheric air to the outlets; the housing being fashioned in two parts or sub-assemblies which are interconnected at final assembly by the flux collector which is part of the solenoid, the operating parts of the regulator being uniquely formed and arranged to minimize noise of operation, and the entire assembly being uniquely constructed to minimize cost of manufacture.

22 Claims, 19 Drawing Figures

FIG. 4.
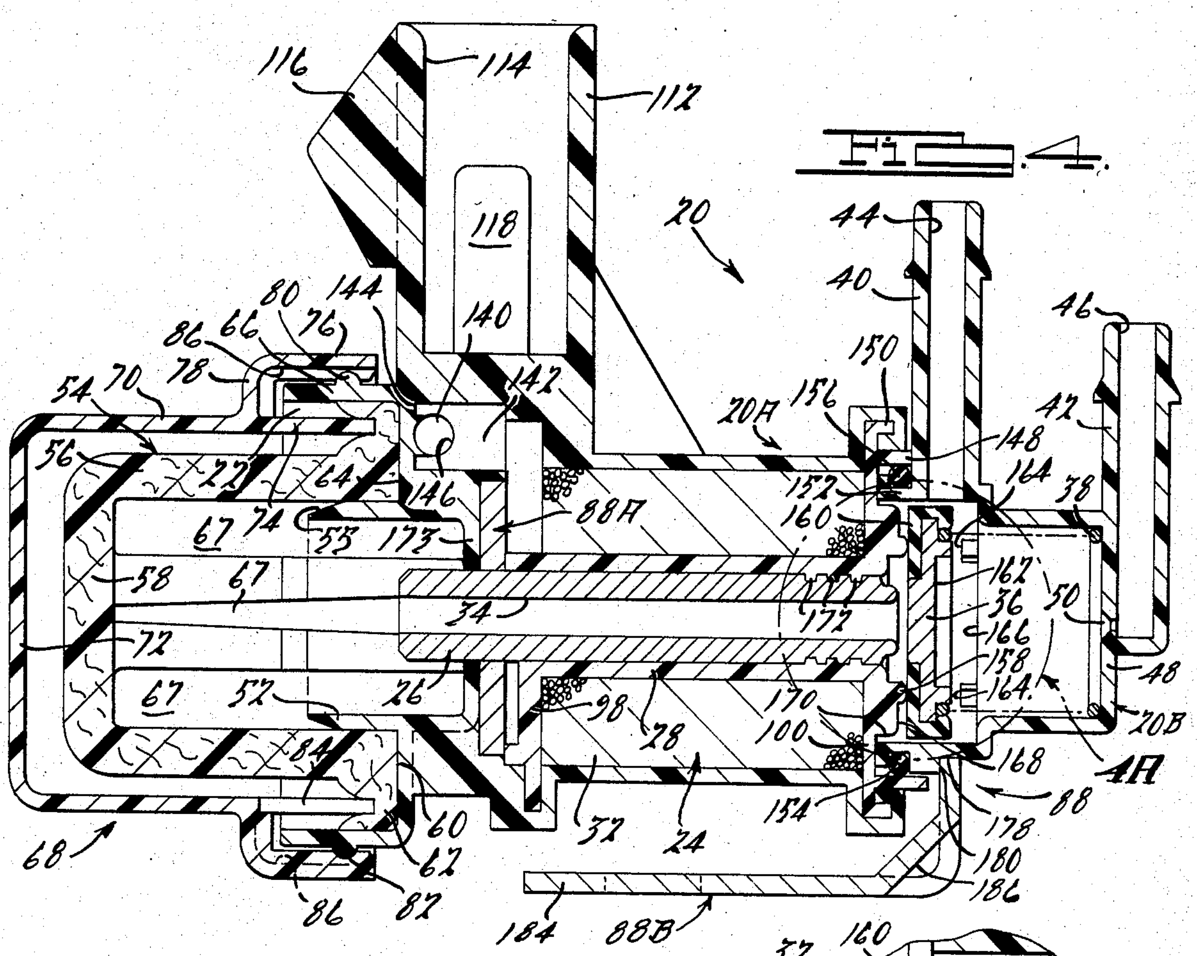
FIG. 4A.
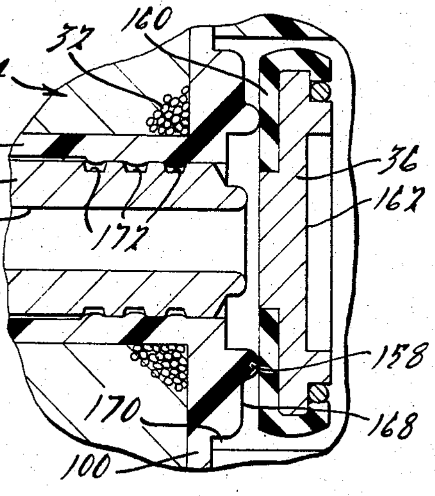
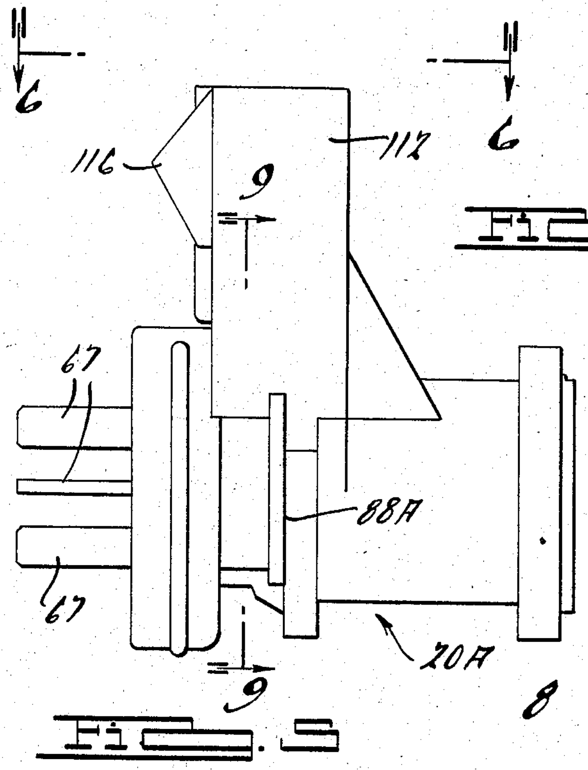
FIG. 5
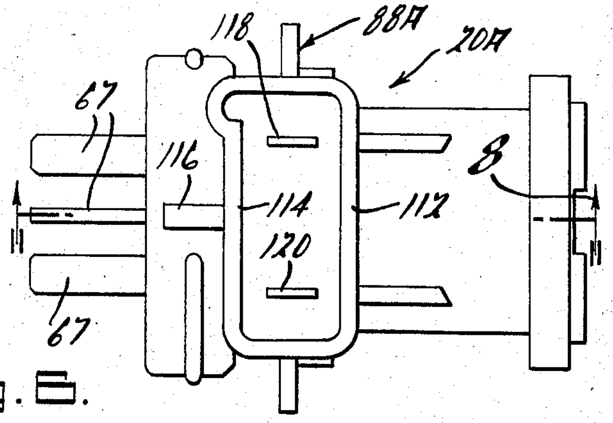
FIG. 6.

VACUUM REGULATOR

BACKGROUND OF THE INVENTION

Conventional vacuum regulators of the type involved here have been generally satisfactory in use; but there has been a need in the art for a simplification in design that makes the device less expensive to manufacture without sacrificing efficiency in operation and that is sufficiently quiet in operation to permit mounting thereof on the dash panel or fire wall of an automotive vehicle without particular annoyance to the occupants of the vehicle. The vacuum regulator herein disclosed is preeminently satisfactory in these respects.

SUMMARY OF THE INVENTION

According to the present invention, the vacuum regulator has been extensively redesigned to make it quieter in operation, and this in turn makes it possible to mount the device on the fire wall or dashboard extension of the vehicle where it is subjected to less shaking and vibration and where it is farther away from destructive engine heat. The redesign features that eliminate or at least minimize the noise to the point that it is no longer objectionable to the occupants of the vehicle also, of course, contributed to the feasibility of mounting the device on the fire wall. In addition, the construction of the vacuum regulator has been changed to significantly reduce its manufacturing cost and conversely to enhance its marketability.

DESCRIPTION OF THE DRAWINGS

FIG. 4 is a longitudinal sectional view taken on the line 4—4 of FIG. 1;

FIG. 4*a* is an enlarged view of the portion of FIG. 4 enclosed in the circle 4A;

FIG. 5 is a side elevational view of the encapsulation sub-assembly comprising a part of the vacuum regulator;

FIG. 6 is a side elevational view looking in the direction of the arrows 6—6 of FIG. 5;

DESCRIPTION OF THE PREFERRED EMBODIMENT

Figure 1:
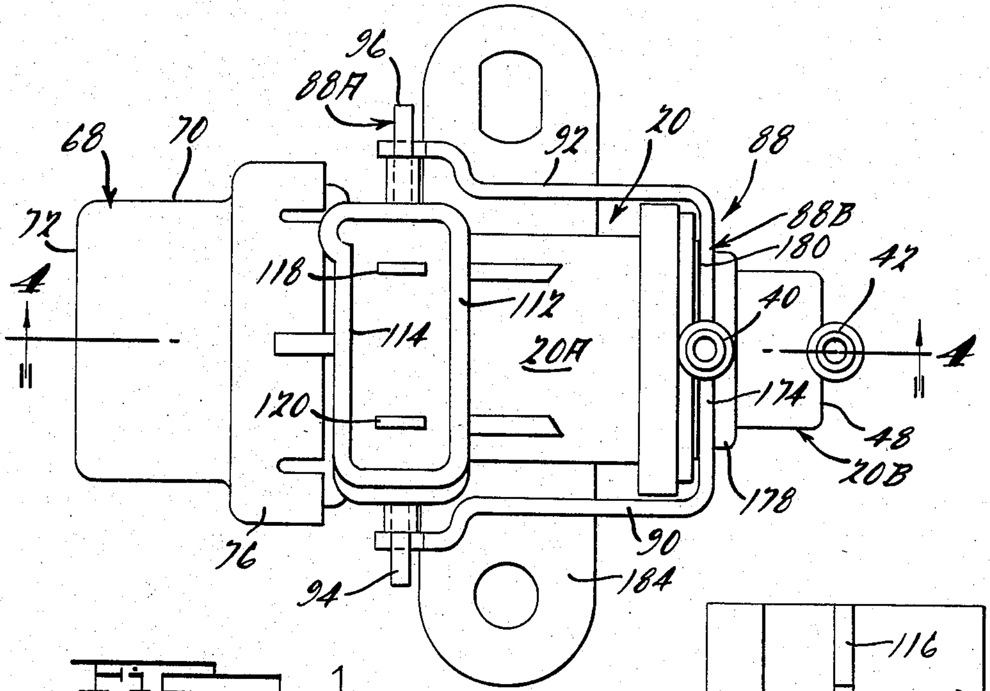
FIG. 1 is a side elevational view of a vacuum regulator embodying the invention.
Figure 2:
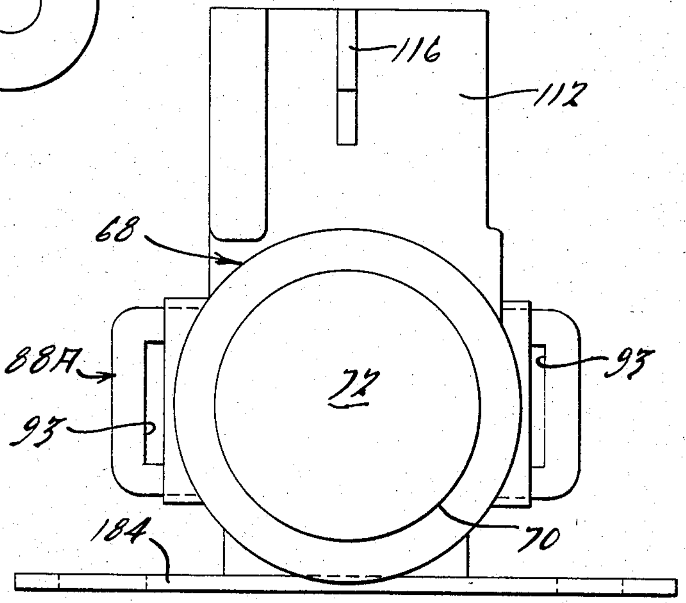
FIG. 2 is a top plan view of the same.
Figure 3:
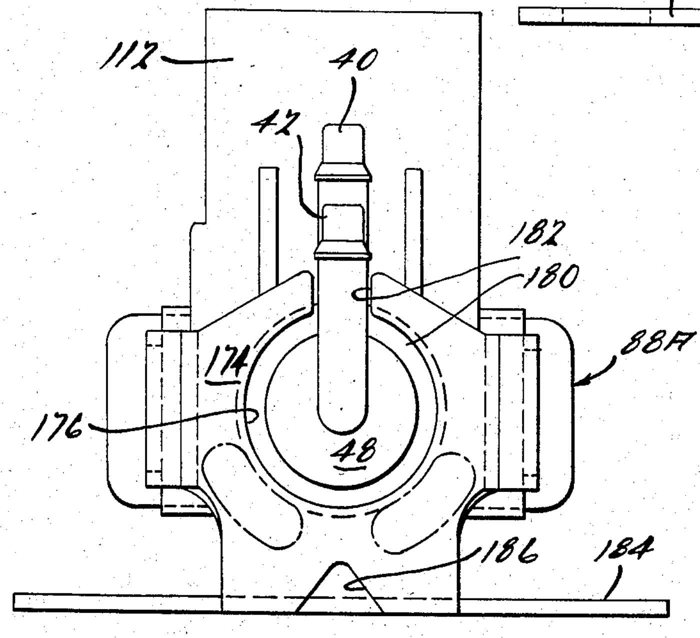
FIG. 3 is a bottom plan view thereof.
Figure 7:
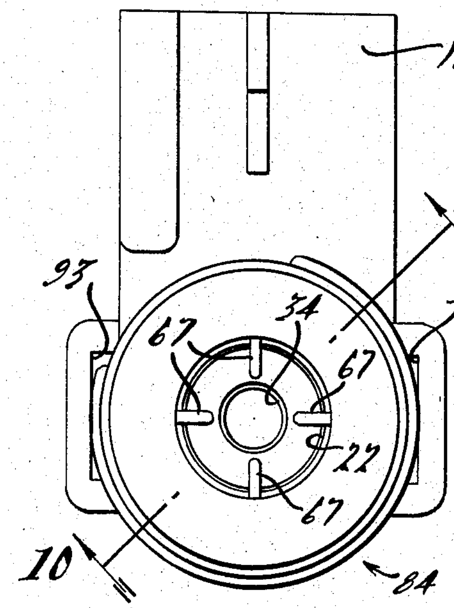
FIG. 7 is a top plan view of the encapsulation sub-assembly.
Figure 9:
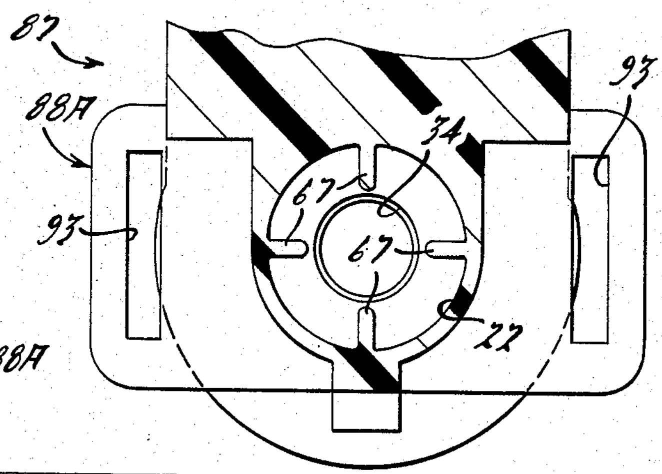
FIG. 9 is a fragmentary transverse sectional view taken on the line 9—9 of FIG. 5.
Figure 8:
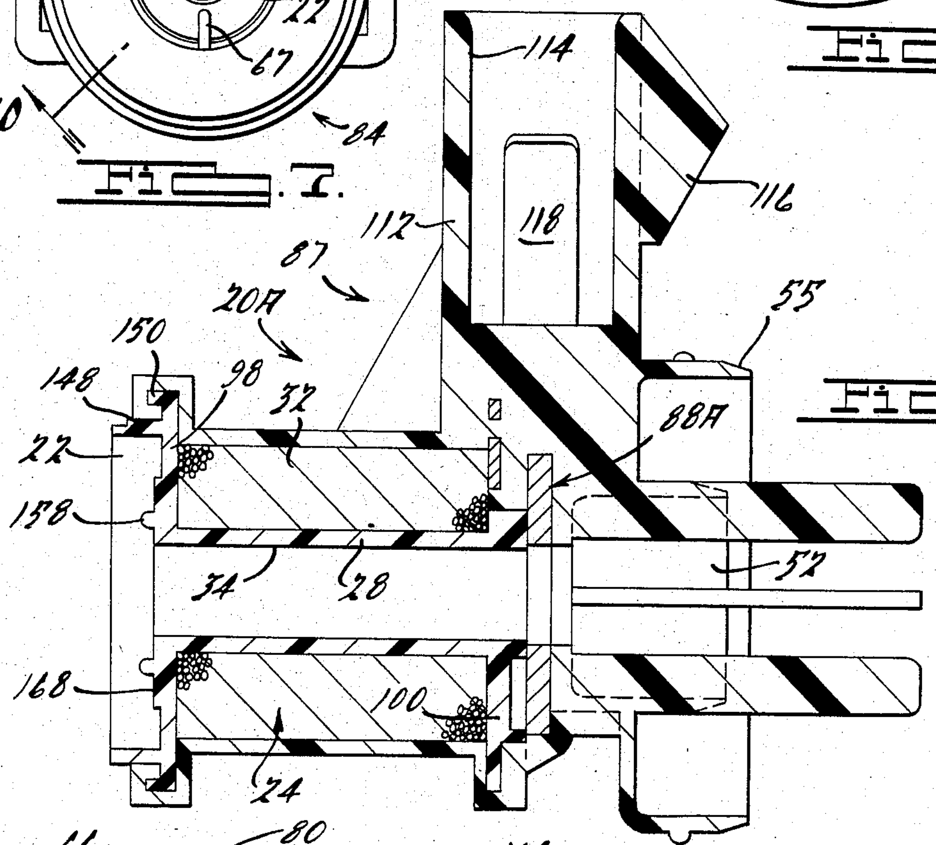
FIG. 8 is a longitudinal sectional view taken on the line 8—8 of FIG. 6.
Figure 10:
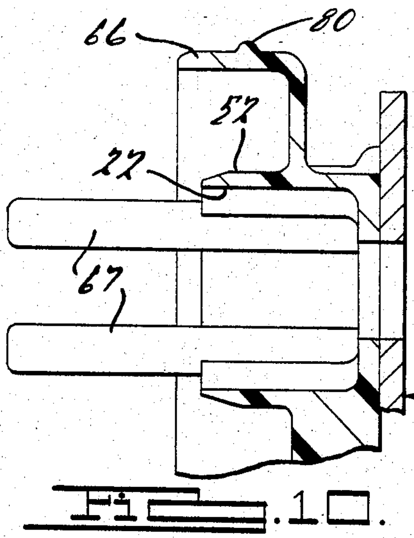
FIG. 10 is a fragmentary longitudinal sectional view taken on the line 10—10 of FIG. 7.
Figure 11:
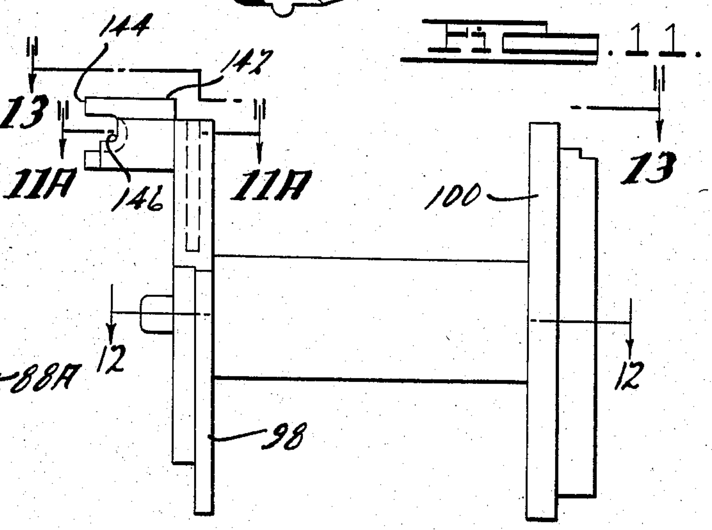
FIG. 11 is a side elevational view of the solenoid bobbin forming a part of the encapsulation sub-assembly.
Figure 11A:
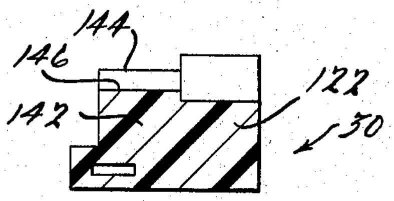
FIG. 11*a* is a longitudinal sectional view taken on the line 11A—11A of FIG. 11.
Figure 12:
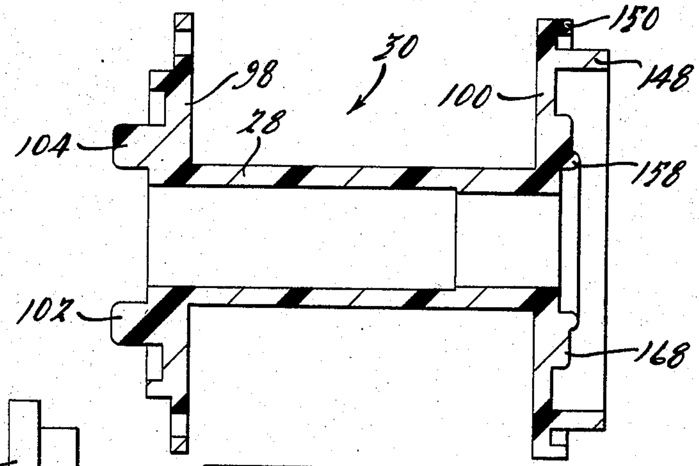
FIG. 12 is a longitudinal sectional view taken on the line 12—12 of FIG. 11.
Figure 13:
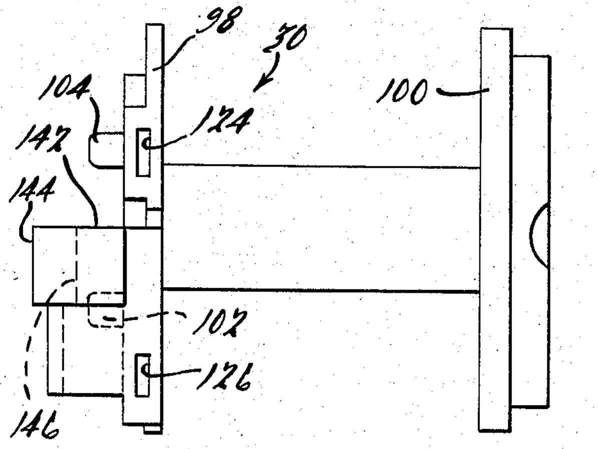
FIG. 13 is a side elevational view of the bobbin looking in the direction of the arrows 13—13 in FIG. 11.

Attention is first directed to FIGS. 1–4 which show the complete assembly of a vacuum regulator embodying the present invention. More particularly, the operating parts of the vacuum regulator are contained within or carried by a housing 20 which comprises upper and lower housing portions 20A and 20B that are formed separately but are normally detachably interconnected at final assembly.

Atmospheric air is admitted into the upper portion 20A of the housing 20 through an inlet 22 at the top of the housing. A solenoid designated generally by the numeral 24 mounted in the upper housing portion 20A includes an electrically magnetic pole piece 26 that extends through the hollow center core 28 of the solenoid bobbin 30; and the latter has the usual winding 32 on the center core. The pole piece 26 is provided with a longitudinal bore 34 through which atmospheric air entering the housing 20 through the inlet 22 passes into the lower housing portion 20B, as shown in FIG. 4. An electrically magnetic solenoid armature 36 disposed in the lower housing portion 20B at the air discharge end of the passageway 34 seats against the lower end of the bobbin 30 under magnetic attraction of the solenoid when the winding 32 is electrically energized and the resilient action of a helical spring 38 disposed between the armature and the bottom of the lower housing portion.

Projecting laterally from the lower housing portion 20B below the armature 36 is a pair of longitudinally spaced connectors 40 and 42 having central passageways 44 and 46. The connector 40 is adapted to be attracted in the usual way by a suitable tubing (not shown) to the computer-controlled exhaust gas recirculation system of the vehicle and the connector 42 is adapted to be connected, also by a suitable tubing (not shown), to the engine exhaust system also in the conventional manner. In the normal operation of the vehicle, there is from 0.5 to 6.0 inches of mercury vacuum in the passageway 44 as deetermined by the EGR value (not shown) of the exhaust gas recirculation system and there is from 14 to 20 inches of mercury vacuum in the passageway 46 by reason of its connection to the engine exhaust system. It will be observed that the connector 42 is disposed below the bottom 48 of the lower housing portion 20B and that it communicates with the lower housing portion solely through a flow restrictive orifice 50. The solenoid 24 is electrically connected to the computer in the exhaust gas recirculation system of the vehicle in the conventional manner; and the computer regulates flow of current from the electrical system of the vehicle through the winding 32 depending on road conditions and the operational requirements of the vehicle.

When the vehicle with which the vacuum regulator of this invention is associated is not in operation, the spring 38 holds the armature valve 36 against the solenoid bobbin 30 to close the air passage 34. However, when the vehicle is in operation, the computer selectively energizes the solenoid 24 to augment the yieldable force exerted on the armature valve by the spring 38 and in opposition to the effect of the vacuum from the engine exhaust system which, as suggested, has limited or restricted communication with the lower housing portion 20B through the flow restrictive orifice 50. The amount of vacuum in the exhaust gas recirculation system is controlled by selective opening and closing movement of the armature valve 36 as determined by the collective forces exerted thereon by the spring 38, the solenoid 24, and the vehicle exhaust system all under the control of the EGR valve. Thus, the vacuum regulator of this invention functions in the conventional manner to control the amount of vacuum in the exhaust gas recirculation system by selectively controlling the size of the flow passage past the armature valve 36 so that atmospheric air entering the lower housing portion 20B through the passageway 34 enters the passageway 44 at a less than atmospheric pressure as determined by the amount of vacuum in the passageway 46 and the operational requirements of the vehicle as sensed by the computer; and, since the invention itself resides essentially in the unique construction and assembly of the regulator itself, a detailed description of its operation in conjunction with the engine is not necessary for a complete understanding of the invention.

In order to make the vacuum regulator more efficient in its air cleaning capability and to facilitate assembly of the air filtering part of the regulator as well as to minimize manufacturing cost, the upper housing portion 20A is formed around the inlet 22 with a longitudinally extending annular flange 52 that serves as a guide for a generally cup-shaped air filtering element 54 which in the present invention preferably is made of a relatively soft, spongy and flexible material. To this end, the flange 52 is provided at the outer side and adjacent to the free edge thereof with a beveled surface 55 that serves to center the filter element 54 and to hold the free edge portion thereof open as it is pushed onto the flange.

Heretofore, filters of the type involved here have been made with a cylindrical side wall of currugated configuration in transverse section. The corrugations are made relatively deep and close together to maximize the surface area of the wall and both ends of the latter are closed by caps having radially inwardly extending tabs that project into and snugly fit the individual corrugations. The side wall is made of a porous, air permeable, paper-like material and the end caps are non porous and consequentially impervious to air. In practice, the extending end of the pole piece 26 projects through an opening in one of the end caps so that all of the air entering the regulator housing through the inlet 22 passes through and is filtered by the cylindrical wall. However, in order to assure that all of the air entering the air passage 34 passes through the filter, it is essential that every end cap tab fit its side wall corrugation precisely and that the end cap opening have an interference fit with the pole piece. These requirements make the filter expensive to manufacture and creates problems at assembly if the desired filtering efficiency is to be achieved and this is true particularly if the regulator is mass produced and the assembly operations are automated.

It is a feature of this invention that the filter element 54 is made relatively inexpensively from a suitable felted open-cell polyurethane sheet material. Although this material is relatively soft and flexible, it has superior air filtering properties and it can be formed relatively inexpensively by molding an appropriately sized piece of the material in a heated die. The polyurethane sheet material from which the filters are made normally is relatively thicker than desired for the purpose here at hand and it is exceedingly flexible and yieldable. However, if it is compressed so as to be substantially reduced in thickness by successive heating operations as during the molding step referred to above, it acquires unexpectedly superior air filtering properties and it becomes stronger and more rigid so that it readily holds it shape, can be readily handled and is not so easily deformed as not to be suitable for automated assembly. More particularly, three successive compressing operations, sometimes referred to in the trade as "felting" has been found to produce the optimum condition for air filtering purposes required by the vacuum regulator of this invention. As a consequence, its manufacturing cost is substantially less than the prior art filters described above and the overall efficiency of the filter is much improved. In practice, the polyurethane sheet material is simply molded and compressed under pressure on a heated mandrel. The finished filtering element can then be easily removed from the mandrel and readily handled at final assembly. The heat and pressure to which the polyurethane material is subjected during the forming operation reduces the cell size somewhat and enhances the air filtering properties of the material when used in the particular environment of the vacuum regulator of this invention.

In practice, the filtering element 54 is formed with a cylindrical side wall 56 having a closed end 58 and an open end 60 that fits snugly over the air-inlet-defining flange 52. The open end 60 is formed with a radially outwardly extending annular flange 62 that rests on and is supported by a radial seating surface 64 provided on the upper housing portion 20A around the flange 52, and the outer edge of the filter flange 62 preferably fits relatively snugly within a second longitudinal flange 66 that is disposed radially outwardly of and concentrically to the flange 52. Thus, the filter flange 62 is confined between the two body flanges 52 and 66 and the latter flanges mutually cooperate to hold the filter element 54 properly centered with respect to the air inlet 22. A plurality of circumferentially spaced longitudinal ribs or blades 67 on and preferably formed as integral parts of the upper body portion 20A around the air inlet 22 project into the filtering element 54 and suppot the side and end walls 56 and 58 thereof.

If desired, the thickness dimension of the filter flange 62 can be greater than the thickness dimension of the rest of the filter since this flange does not serve a filtering function in use and it is desirable that it have relatively greater compressibility for reasons that will be hereinafter apparent.

By reason of its unique shape and the manner in which it is mounted on the body 20, the filtering element 54 is kep clear of the pole piece 26 at all times and there is no interference between the two when the filtering element is assembled on the body. This feature is highly advantageously in the final assembly operations as compared with the conventional filter hereinabove referred to which is not only more expensive to make but requires more time to assemble and is less efficient in use due to air leaks between the side wall and the end caps and between the bottom or inner end cap and the pole piece.

The filtering element 54 of this invention is provided with a cover 68 that is similar in shape to the filtering element but is sufficiently larger so that it is spaced outwardly on all sides from the filter. More particularly, the cover 68 has a cylindrical wall 70 which is closed as shown at 72 at the outer end thereof. The inner end of the cover 68 is open and is formed with longitudinally extending, radially spaced inner and outer annular flanges 74 and 76. In the particular form of the invention here shown, the inner flange 74 forms an extension of the cylindrical wall 70, and the flange 76 is offset radially outwardly from the inner flange 74 by an integral connecting portion 78.

At assembly, the two cover flanges 74 and 76 are disposed in embracing relation with respect to the air inlet defining housing flange 66 and they are spaced radially inwardly and outwardly from the flange 66 to define intercommunicating outer and inner annular air passages between the interfitting flanges and around the free edge of the intermediate housing flange. An annular bead or rib 80 on the outer side of the housing flange 66 has a snap fit association with an annular groove 82 on the inner side of the outer cover flange 76 to position the cover longitudinally with respect to the housing and to hold the cover 68 securely but removably attached to the housing. A plurality of circumferentially spaced longitudinal slots 84 are provided in the inner cover flange 74, and longitudinal grooves 86 at the inner side of the outer cover flange 76 communicate with the slots 84 to facilitate passage of atmospheric air into the cover 68. Ideally, the slots 84 and the grooves 86 are staggered one with respect to the other, so as to require some circumferential movement of air entering the housing 20 and consequentially some filtering of any heavy particles that may be carried along by the incoming air.

In addition to holding the cover 68 attached to the housing 20, the detachable snap fastener connection between the cover and the housing flange 66 holds the inner flange 84 embedded or pressed into the filter flange 62, as perhaps best shown in FIG. 4. The fact that the filter flange 62 is made relatively thick assures essentially deep penetration of the cover flange into the filter material and consequentially an air-tight engagement between the seat 64 and the outer radial surface of the filter flange to positively and effectively prevent atmospheric air entering the cover 68 from bypassing the air filtering element 54 and entering the housing inlet 22 without being filtered. At the same time, the cover 68 can be readily removed for periodic cleaning or replacement of the filtering element 54. In this connection, it will be appreciated that the position of the vacuum regulator in the engine compartment of the vehicle and the consequential exposure thereof to road splash and dirt makes it necessary or desirable to clean or replace the filtering element 54 at regular intervals. Manifestly, the present construction and arrangement of parts makes it possible to perform this service operation easily and quickly. At the same time, the interfitting housing and cover flanges hold the cover 68 spaced uniformly from the filter element at all times and keeps the passages through which atmospheric air flows to the filter uniformly wide and open at all times in the use of the equipment. The inner housing flange 52, of course, also assists the interfitting cover flanges 74 and 76 in holding the filtering element 54 precisely concentrically with respect to the cylindrical cover wall 70 and coaxially with respect to the air inlet 22.

It is a particular feature of this invention that the upper housing portion 20A is formed as an encapsulation sub-assembly here designated generally by the numeral 87. The sub-assembly 87 preferably is made of a suitable plastic resin material by conventional injection molding operation, with the solenoid 24, certain components which are part of the electrical circuitry that includes the solenoid, and one part 88A of a two-part flux collector 88 which is part of the solenoid assembly, molded into and contained in or enclosed by the housing shell. The other part 88B of the flux collector 88 carries and supports the lower housing portion 20B; and it has laterally spaced, longitudinal arms 90 and 92 disposed exteriorly and at opposite sides of the lower housing portion. The two arm portions 90 and 92 also extend alongside the upper housing portion 20A and are adapted to project through and to be detachably connected to respective terminal portions 94 and 96 of the first mentioned flux collector part 88A that project exteriorly of the upper housing as shown in FIG. 1. This arrangement permits the two housing portions 20A and 20B to be joined together easily and quickly at final assembly and the interconnected flux collector parts 88A and 88B thereafter hold the two housing portions securely together and effectively sealed against road splash and dirt as well as engine and other contaminants to which they are exposed under the conditions of use.

Thus, the upper housing portion 20A and all of the parts associated therewith, except for the filter 54 and the cover 68 are injection molded directly in the encapsulated sub-assembly 87. This permits the sub-assembly 87 to be made easily, quickly and relatively inexpensively; and it also assures that the solenoid and associated electrical components thereof, that might otherwise by physically damaged or otherwise adversely affected by contaminants to which the vacuum regulator of this invention is exposed in use, are effectively protected from and sealed against destructive elements and conditions as well as physical damage and abuse to which the various parts of the sub-assembly might otherwise be exposed or subjected to during servicing of the engine or other parts of the vehicle.

The lower housing portion 20B and the cover 68 also preferably are made of a suitable plastic resin material by conventional injection molding operations. Thus, the only metallic parts of the final assembly are the wire in the solenoid winding 32, the pole piece 26, the armature 36, the spring 38, and the flux collector 88; and the arrangement effectively encloses and protects all of the metallic parts except for thos portions of the flux collector 88 that are disposed exteriorly of the assembly. The injection molded plastic resin parts of the final assembly contribute signficantly to the quiet operation of the vacuum regulator and eliminate or at least substantially mitigate noise that has been a serious problem with previous vacuum regulators of the type involved here.

As clearly shown in the drawing, the bobbin 30 is formed at opposite ends of the core 28 with laterally outwardly extending radial flanges 98 and 100. The flux collector part 88A is mounted on the bobin 30 at the outer side of the bobbin flange 98 prior to the injection molding operation; and in order to hold the flux collector part properly oriented for subsequent interlocking engagement with the lower flux collector part 88B, the bobbin flange 98 is formed at diametrically opposite sides of the core 28 with a pair of longitudinal studs 102 and 104 that extend through recesses 106 and 108 provided in the flux collector part 88A at diametrically opposite sides of a central opening 110 through which the pole piece 26 extends, as shown in FIG. 4.

The upper housing portion 20A is formed adjacent the upper end thereof with a laterally outwardly extending electrical connector 112 by means of which the electrical circuit contained within the vacuum regulator is electrically connected to the larger circuit (not shown) which is a standard part of the automotive vehicle with which the vacuum regulator is intended to be used. As perhaps best shown in FIG. 4, the connector 112 is formed with a central socket 114 which interfits with a plug connector (not shown) with which the larger exterior circuit referred to above conventionally is provided; and the connector 112 is formed also with a conventional laterally projecting tab 116 for mechanical interlocking connection with the mating connector in a manner well known in the art.

Figure 15:
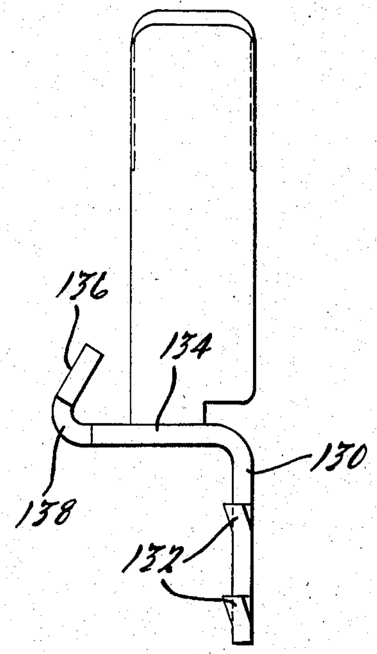
FIG. 15 is a side elevational view of the terminal blade forming a part of the encapsulation sub-assembly.
Figure 16:
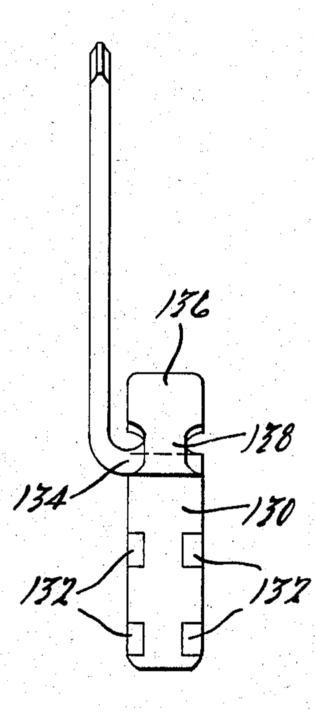
FIG. 16 is a top plan view of the terminal blade.
Figure 17:
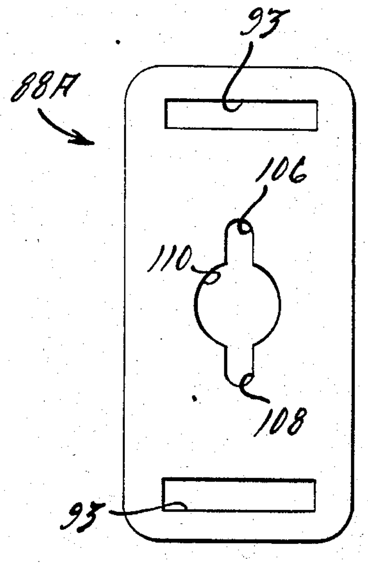
FIG. 17 is a plan view of the upper flux collector plate which is a part of the encapsulation sub-assembly.

Electrical connection with the mating connector is established by a pair of terminal blades 118 and 120 (FIG. 1) that, according to the present invention, are mounted on the bobbin flange 98 prior to the injection molding operation by which the encapsulation sub-assembly 87 is formed. To this end, attention is directed to FIG. 14 which is a plan view of the flange 98 to which the terminal blades 118 and 120 are attached. It will be observed that the flange 98 is formed with an enlargement 122 in which are formed a pair of laterally spaced sockets 124 and 126 that open through the edge 128 of the enlargement. Both of the terminal blades 118 and 120 are formed with rearwardly extending longitudinal portions 130 that are adapted to be pushed into the sockets 124 and 136. In order to assure retention of the terminal blades within the sockets, the blade portions 130 are formed with barbs 132 that are struck and bent laterally therefrom. Since the bobbin 30 is made of a plastic resin material, the barbs 132 penetrate the material when the blades 118 and 120 are pushed into the socket 114 and thereafter resist removal of the blades. Each of the terminal blades 118 and 120 also is formed intermediate the ends thereof with a transversely extending flange 134 which is disposed at right angles to the front blade portion and to the rear extension 130, as shown in FIGS. 15 and 16; and the flange 134 terminates in an acutely angularly bent tabe 136 that is necked down as shown at 138. In practice, the terminal portions of wire from the solenoid winding 32 are wrapped around the necked down portions 138 of the terminal blades after the latter have been assembled on the bobbin 30 and before the injection molding operation that forms the encapsulation sub-assembly 87; and the tabs 136 are then pressed down tightly against the transverse flanges 134 to clamp the wire securely in place. Preferably, the tabs 136 are bent under pressure by suitable electrodes as described in the copending application, Ser. No. 375,764, filed May 6, 1982, now abandoned, and entitled, "Electric Wiring Terminal and Method of Making the Same", to establish a good electrical connection between the wire and the blades as well as an effective mechanical clamping action that is established when the tabs are bent back against the transverse flanges 134. As shown in FIGS. 1 and 4, after assembly on the bobbin 30, the terminal blades 118 and 120 project into the socket 114 of the electrical connector 112 where they are positioned for detachable connection to the electrical plug of the outer circuit hereinabove referred to. Then, when the bobbin 30 is mounted in the mold prior to injection molding, the terminal blades 118 and 120 are properly positioned with respect to each other and they will be properly positioned in the socket 124 when the latter is formed by the injection molding operation. Thereafter, the encapsulation shell completely encloses and seals the inner terminal portions of the blades 118 and 120 including the wiring connections from the winding 32 to fully protect the same from the environment in which the vacuum regulator is used leaving only the outer end portions of the blades exposed for attachment to the external circuit plug in the manner described.

Certain electrical components in addition to those previously referred to also are part of the internal circuitry contained within the vacuum regulator, per se, and more particularly in the encapsulation subassembly 87. For example, a diode 140 is inserted in one of the leads from the solenoid winding 32. This diode 140 is heat sensitive and can easily be damaged or even destroyed by the conditions, and particularly the heat conditions, within the mold when the plastic resin material is injected into the mold cavity to form the encapsulation shell. On the other hand, it is desirable that the diode and the electrical connections to the diode be molded into the shell material. A way to accomplish these somewhat inconsistent objectives was not immediately apparent; and preliminarily at least, it was not possible to get a consistently acceptable end product until the diode was mounted in a particular manner and in a particular location in the encapsulation shell. For example, it was found that if the diode 140 is supported by a cradle 142 on the upper flange 98 of the bobbin 30 so as to position the diode in close proximity to the outside surface of the encapsulation shell, the diode is not significantly affected by the injection molding operation and this is consistently true even when the encapsulation sub-assembly is automated and mass produced.

Figure 14:
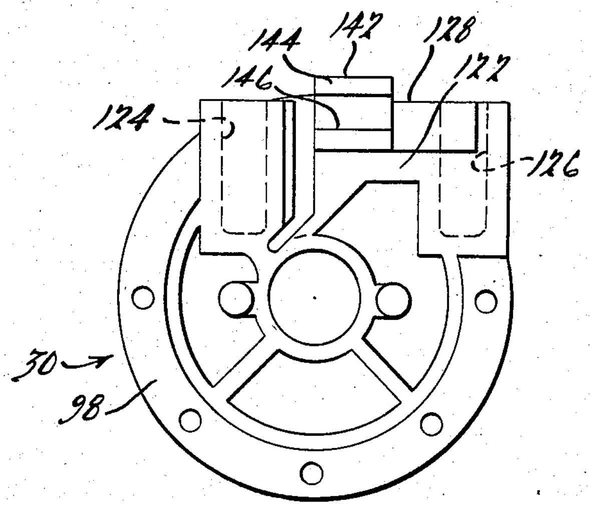
FIG. 14 is a top plan view of the bobbin.

In connection with the foregoing, it is desirable that the cradle 142 be in the form of a solid block, as perhaps best shown in FIGS. 4 and 14, and that the block be formed in the top surface 144 thereof with a semi-cylindrical groove 146 that conforms at least generally to the surface contour of the diode 140 over a substantial portion of its total surface area. When this relationship between the diode 140 and the cradle 142 obtains, the diode is in intimate physical contact with the cradle supporting surface 142 and the relatively large volume of the cradle block absorbs much of the heat that otherwise would be absorbed by the diode during the injection molding operation. In other words, the cradle block 142 acts as a heat sink which takes heat away from the diode 140 and, since the injection molding step is of relatively short duration, the amount of heat absorbed by the cradle block is enough to keep the diode sufficiently cool so that it is not seriously adversely affected by the injection molding step.

Also, in the particular form of the invention here shown, the cradle 142 when positioned adjacent to the periphery of the bobbin flange 98 as shown disposes the diode 140 essentially close to an exterior surface of the encapsulation shell. In the particular arrangement here shown, the diode 140 is positioned directly behind and in close proximity to the filter seating surface 64. Thus, when the plastic resin material is injected into the mold cavity to form the encapsulated shell, the cradle 142 absorbs much of the heat that otherwise would be taken by the diode. Moreover, the diode is disposed relatively close to the surface 64 of the mold cavity. In most instances, the mold is water cooled so that heat is drawn away from the diode 140 not only by the cradle block 142 but also by the adjacent water cooled surface of the mold part. In addition, as soon as the encapsulation sub-assembly is ejected from the mold cavity, the radial, filter-seating surface 64 is exposed to relatively cool atmospheric air which has a prompt cooling effect on the diode 140 because of the essential thinness of the portion of the shell between the diode and the surface 64.

The conditions described above, singly and in combination, contribute to the beneficial result of keeping the diode 140 sufficiently cooled during and as a result of the injection molding operation and they effectively prevent the diode from being harmed to any significant extent during or as a result of the injection molding operation.

The lower end of the bobbin 30 is effectively sealed by forming the lower bobbin flange 100 with radially spaced, inner and outer, longitudinal annular flanges 148 and 150 (FIG. 4). As shown, the inner annular flange 148 is longer than the outer annular flange 150 and the encapsulation shell is formed entirely around the outer annular flange as well as the portion of the lower bobbin flange 100 that extends between the two flanges 148 and 150. In other words, the encapsulation shell is wrapped around the outer marginal portion of the lower bobbin flange 100 making it practically impossible for moisture to gain access to the interior of the solenoid along the parting line between the bobbin lower flange 100 and the encapsulation shell.

The vacuum regulator of this invention is effectively sealed at the juncture between the upper and lower body portions 20A and 20B by forming the lower body portion 20b with a longitudinally extending annular flange 152 that overlaps and is spaced radially inwardly from the inner annular flange 148 of the upper body portion 20A. An annular groove 154 in the outer surface of the flange 152 receives an O-ring 156. The latter is confined between and compressed by the flanges 148 and 152 so that, when the two housing sections 20A and 20B are joined together, the compressed O-ring 156 provides an air and moisture-proof seal between the two housing portions 20A and 20B.

The armature 36, of course, must be made of a material that is attracted by the magentic field that is generated when electric current is passed through the winding 32. Heretofore, the practice has been to make the bobbin with a brass insert that forms the seat for the armature 36 at the lower end of the solenoid. With this arrangement, the armature is pulled against the seat to close the passage 34 when the solenoid 24 is energized; and, when the solenoid is deenergized, the armature is drawn away from the seat by the partial vacuum in the lower housing portion 20B to open the passageway 34. In practice, the solenoid 24 may be energized and deenergized at frequent intervals which results in the armature striking the valve seat at equally frequent intervals. There is a loud clicking noise each time the armature strikes the seat; and, if the solenoid is energized at sufficiently short intervals, the armature produces a loud chattering noise. In fact, engagement of the metal armature with the metal seat is sufficiently noisy as to prevent the vacuum regulator from being mounted on the fire wall or otherwise adjacent to the passenger compartment since the noise is loud enough to be clearly audible inside the vehicle and to be an annoyance to persons in the passenger compartment.

Accordingly, the prior art aramture and valve seat construction has been modified according to the present invention to eliminate the noise or at least to mitigate it to the point it is no longer objectionable. To this end, the lower flange of the solenoid bobbin 30 is formed to provide a molded integral annular seat 158 around the passageway; and the armature 36 has been modified by providing it with a peripheral seating member 160 that engages the seat 158. The seating member 160 that strikes the seat 158 preferably is made of rubber and is molded around the peripheral edge of the armature and disk and adhesively or otherwise secured thereto. The bobbin 30 in turn is formed of a suitable plastic resin material and the annular seat 158 is molded on the bobbin as an integral part thereof so that it too is of the same material. This construction and arrangement of parts is much less expensive than the prior construction described above and it is relatively, essentially noiseless in operation.

Depending on the weight of the armature 36 and other factors affecting operation of the vacuum regulator, it may be necessary or desirable to lighten the armature by forming a cavity or recess in the undersurface thereof as shown at 162.

It is desirable also to provide a plurality of circumferentially spaced stops 164 in the housing portion 20B below the armature 36 against which the latter seats in the fully open position so as to limit the opening movement of the armature and to permit the latter to respond more quickly to energization and deenergization of the solenoid 24 and thus be more responsive to signals received from the computer that controls operation of the device. In practice, the lower housing portion 20B is formed below the armature 36 with an annular shoulder 166 that is overlapped by the peripheral marginal portion of the armature; and the stops 164 extend upwardly from the shoulder inside the helical spring 38 to engage the armature inwardly of the wrapped-around marginal edge portion of the seating member 160.

From the foregoing, it will be readily apparent that, at final assembly, the armature 36 is dropped into the lower housing chamber 167 through the open top thereof before the two housing portions 20A and 20B are joined together. Then, after the two housing sections are interconnected by the two flux collector parts 88A and 88B, the latter perform the additional function of holding the armature assembled with the encapsulation sub-assembly thus eliminating the necessity and expense of providing the usual cage for holding and limiting the travel of the armature. In this connection, it will be apparent also that the portion of the lower housing side wall that extends upwardly from the stops 164 limits lateral movement of the armature 36 and guides it in its longitudinal travel to assure proper engagement thereof with the valve seat 158.

Manifestly, when the armature 36 is open of away from the valve seat 158, filtered atmospheric air in the passageway 34 moves radially outwardly past the valve seat 158 and around the peripheral edge of the armature to raise the pressure or, alternatively, to decrease the amount of vacuum in the lower housing portion 20B. On the other hand, when the armature 36 is engaged with the seat 158 to shut off communication between the passageway 34 and the lower housing portion 20B, pressure in the lower housing portion is reduced, or alternatively, the vacuum in the lower housing portion is increased. Thus, by selectively opening and closing the armature under command of the computer, it is possible for the computer to maintain the pressure in the lower housing portion 20B within relatively close limits.

It has been found that air from the passageway 34 flowing radially outwardly between the lower end of the bobbin and the open armature 36 also produces noise that is audible in the passenger compartment if the vacuum regulator is mounted at the most convenient location on the fire wall of the engine compartment. This noise apparently is due to turbulence of the air as the latter rushes radially away from the passageway 34; and it has been found that this turbulence and the resulting noise can be significantly reduced to this point where it is no longer objectionable by forming the bobbin flange 100 with an annular shoulder or ledge 168 directly radially outwardly of the valve seat 158. The ledge 168 reduces the space between the solenoid flange 100 and the armature 36 immediately radially outwardly of the valve seat 158 and makes it sufficiently narrow to control the radial air flow in a manner that prevents turbulence in the air and, consequentially, the objectionable noise referred to above. The ledge 168 preferably does not extend radially outwardly all the way to the surrounding annular wall of the lower housing portion 20B. Rather, it terminates a short distance from the wall to provide a narrow annular space or pocket 170 into which the air moves as it changes its direction of travel and flows longitudinally of the lower housing portion 20B around the armature 36, into the connector passageway 44 and the lower housing portion 20B below the armature 36. These spatial features, acting individually and in combination, have proved to be quite effective in controlling turbulence and the resulting noise due to air movement in the vacuum regulator when the armature 36 is open or away from its seat 158.

In the operation of the vacuum regulator, it is important that the spatial dimension between the lower end of the pole piece 26 and the confronting surface of the armature 36 be precisely controlled and maintained. This is accomplished effectively and inexpensively according to the present invention by forming the lower terminal portion of the pole piece 26 with a series of longitudinally spaced annular grooves 172 and making the bore of the bobbin core extending upwardly, or to the left as viewed in FIG. 4, from the grooves, slightly larger in diameter than the pole piece. Thus, the pole piece 26 is slightly smaller in diameter than the bore of the bobbin core portion 28 extending from the grooves 172 so as to provide a loose sliding, clearance fit therebetween. On the other hand, the portion of the bore that accepts the relatively short grooved portion of the pole piece 26 is slightly smaller in diameter than the pole piece to provide an interference fit therebetween. In practice, the pole piece 26 is pushed into the bobbin 30 from the right hand end of the latter as viewed in FIG. 4. The pole piece slides easily in the core until the grooved portion thereof reaches the lower bobbin flange 100. Thereafter, the pole piece 26 is forced into the bobbin core portion 28 to its final longitudinal position which may be determined for preciseness in any conventional manner as by the use of a suitable fixture. After the pole piece 26 has been properly positioned in the bobbin 30, the plastic material that has been forced outwardly by the pole piece as a result of the interference fit, tries to resume its previous diameter; and, as it constricts, the plastic material penetrates the grooves 172 and holds the pole piece securely in its final position. In this connection, it will be observed (FIG. 4) that, as finally positioned, the upper terminal portion of the pole piece 26 extends through the upper flux collector 88A and a layer 173 of the encapsulation sub-assembly with which it is in sealing engagement to assure forced entry through the filtering element 54 of all air entering the passage 34.

It also is a feature of this invention that the two flux collector parts 88A and 88B are not only detachably interconnected at final assembly to hold the lower housing portion 20B assembled with the encapsulation sub-assembly 87, but it also provides a mounting bracket for the assembled vacuum regulator. To this end, the bight portion 174 that interconnects the arms 90 and 92 previously referred to, is formed intermediate the ends thereof with an opening 176 that receives the lower housing portion 20B and seats upwardly against an annular shoulder 180. A radial slot 182 at one side of the opening 176 accommodates the connector 40, as perhaps best shown in FIG. 3. In any event, the lower housing portion 20B is dropped into the opening 176 prior to the final assembly and the two housing portions 20A and 20B are then assembled together in the manner hereinabove described. This final assembly operation disposes a flange 184 formed on the bight portion 174 laterally of the assembly for mounting on whatever structure is to support the vacuum regulator which, as previously described, is intended to be the engine fire wall. In any event, the mounting flange 184 is disposed sufficiently laterally of the vacuum regulator assembly to position the latter in the available space; and, in order to inhibit vibration or shaking of the assembly during operation of the vehicle, the mounting bracket preferably is formed with a strengthening and rigidifying indentation 186 at the juncture thereof with the flux collector bight portion 174.

While it will be apparent that the invention herein described is well calculated to achieve the benefits and advantages as hereinabove set forth, it will be appreciated that the invention is susceptible to modification, variation and change without departing from the spirit thereof.

We claim:

1. In a vacuum regulator for automotive vehicles of the type having an engine exhaust system and a computer controlled exhaust gas recirculation system, said vacuum regulator comprising a housing having separate interconnected upper and lower portions, said lower housing portion having spaced primary and secondary outlets interconnected by a flow restrictive orifice, said primary outlet adapted to be connected to and to communicate with said exhaust gas recirculation system and said secondary outlet adapted to be connected and to communicate with said engine exhaust system;

a solenoid in said housing including a bobbin having a valve seat, a pole piece in said bobbin, and an armature disposed between said pole piece and said outlets movable against and from said valve seat;

means defining an inlet for atmospheric air into said housing and a passageway extending from said inlet through said pole piece and said valve seat to said outlets, said passageway adapted to be selectively opened and closed by said armature to control flow of atmospheric air therethrough;

spring means engaging said armature and yieldably holding the same normally against said valve seat;

a filter disposed between said inlet and said pole piece extending transversely across said passageway with a peripheral portion thereof engaging an annular seating surface surrounding said passageway, whereby atmospheric air entering said housing through said inlet is required to pass through said filter before traversing the portion of said passageway extending through said pole piece;

a cover for said filter detachably fastened to and readily removable from said housing and in the fastened position engaging the peripheral portion of said filter and holding the same tightly against said seating surface;

an electrical circuit encased in said housing, said circuit including said solenoid and having an external connector adapted to be electrically connected to a source of electrical energy; and flux collector means for and around said solenoid.

2. A vacuum regulator as defined by claim 1, wherein said housing is formed with a cover retaining member radially outwardly of said inlet;

wherein said seating surface is annular in form and disposed between said cover retaining member and said passageway;

wherein said filter is disposed over said inlet with a peripheral portion thereof resting on and supported by said seating surface; and wherein said cover is provided with radially spaced inner and outer members disposed in straddling relation with respect to said cover retaining member, said outer member being detachably fastened to said cover retaining member and holding said inner member in pressed engagement with the peripheral portion of said filter and the latter on said seating surface; said vacuum regulator further including mutually cooperable means associated with the inner and outer members of said cover and with said cover retaining member permitting entry of atmospheric air to said inlet.

3. A vacuum regulator as defined by claim 2, wherein both said filter and said cover are generally cup-shaped and disposed in spaced-apart relation one within the other over said inlet, said filter and said cover being also disposed over and spaced radially outwardly and longitudinally away from said pole piece, whereby said filter and said cover can be assembled on said housing without interference from said pole piece.

4. A vacuum regulator as defined by claim 3, wherein said filter is made of an open-cell polyurethane material.

5. A vacuum regulator as defined by claim 3, wherein said filter is made of an open-cell felted polyurethane material having top and side walls; and wherein said housing is formed with a plurality of circumferentially spaced, longitudinal ribs disposed radially inwardly of and in supporting relation to said filter side wall.

6. A vacuum regulator as defined by claim 5, wherein said ribs are disposed in supporting relation to both the top and side walls of said filter.

7. A vacuum regulator as defined by claim 1, wherein a terminal portion only of said pole piece adjacent to said armature has an interference fit with said bobbin to hold said pole piece with the mentioned terminal portion thereof in precise longitudinally spaced relation with respect to said armature.

8. A vacuum regulator as defined by claim 1, wherein said pole piece and said armature are of electrically magnetic material and said bobbin and said valve seat are injection molded of plastic resin material.

9. A vacuum regulator as defined by claim 1, wherein said pole piece and said armature are of electrically magnetic material and said valve seat and the seating surface of said armature are of plastic resin material; and wherein said armature in the seated position is spaced precisely from the adjacent end of said pole piece and is operative in response to engine operating conditions at said outlets to regulate the flow of atmospheric air from said passageway to said outlets.

10. A vacuum regulator as defined by claim 9, wherein said valve seat is annular in form; and wherein said bobbin, said pole piece, and said armature collectively define a chamber disposed radially inwardly of said valve seat into which atmospheric air from the passageway in said pole piece is discharged;

said vacuum regulator further including means disposed radially outwardly of said valve seat for restricting flow of and inhibiting turbulence in atmospheric air issuing from said chamber.

11. A vacuum regulator as defined by claim 10, including stop means in said housing at the side of said armature opposite said pole piece for limiting movement of said armature in use away from said pole piece.

12. A vacuum regulator as defined by claim 1, wherein said flux collector means is formed in two parts; and wherein one of said flux collector parts is carried by said upper housing portion and the other of said flux collector parts is carried by said lower housing portion, said flux collector parts being interconnector exteriorly of said housing and holding said upper and lower housing portions securely together.

13. A vacuum regulator as defined by claim 12, wherein one of said flux collector parts extends transversely diametrically through the housing portion with which it is associated; and wherein the other of said flux collector parts is in the form of a U-frame disposed with its arm portions in embracing relation to its associated housing portion and interconnected with said first mentioned flux collector part.

14. A vacuum regulator as defined by claim 13, wherein said housing portions are injection molded of plastic resin material;

wherein said first mentioned flux collector part is molded into and projects exteriorly of the housing portion with which it is associated; and wherein the arm portions of said other flux collector part are detachably interconnected with projecting portions of said first mentioned flux collector part.

15. A vacuum regulator as defined by claim 1, wherein the upper portion of said housing and said solenoid are in the form of an encapsulation sub-assembly; and wherein said flux collector means comprises two-part means carried by said upper and lower housing portions, respectively, and mutually interconnected to hold said upper and lower housing portions releasably together.

16. A vacuum regulator as defined by claim 15, wherein said lower housing is formed with an upper chamber containing said armature and said valve seat, said chamber having an open top through which said armature is introduced into the chamber, and wherein the two parts of said flux collector means are detachably interconnected and serve the dual function of holding the upper and lower housing portions releasably together and of holding said armature assembled with said encapsulation.

17. A vacuum regulator as defined by claim 15, wherein said lower housing is formed with an upper chamber containing said armature and said valve seat, said chamber having an open top through which said armature is introduced into the chamber, wherein said vacuum regulator includes means in said upper chamber for limiting lateral and longitudinal movement of said armature and for guiding the latter in its longitudinal travel to assure proper engagement thereof with said valve seat, and wherein the two parts of said flux collector means are detachably interconnected and serve the dual function of holding the upper and lower housing portions releasably together and of holding said armature assembled with said encapsulation.

18. A vacuum regulator as defined by claim 1, wherein said upper housing portion is injection molded around said solenoid to form an encapsulation sub-assembly; and wherein said pole piece extends through and is in sealing engagement with a part of said upper housing portion adjacent to said inlet, whereby to assure entry of all atmospheric air entering said housing through said inlet into the passageway of said pole piece.

19. A vacuum regulator as defined by claim 1, wherein said electrical circuit includes a heat sensitive component mounted on and supported by said bobbin; and wherein said upper hosing portion is injection molded around said solenoid and said component to form an encapsulation sub-assembly, said component being embedded in said encapsulation and being held in its mounted position on said bobbin in close proximity to an outer surface of said encapsulation during the molding operation, whereby, because of its proximity to the outer surface of the encapsulation and to the wall of the mold cavity in which the encapsulation is formed and consequently its prompt exposure to atmospheric air when the encapsulation is ejected from the cavity, said component is subjected to minimal heat and consequential damage as a result of said injection molding operation.

20. A vacuum regulator as defined by claim 19, wherein said component is a diode.

21. A vacuum regulator as defined by claim 19, wherein said component is supported on said bobbin by a cradle in the form of a block that contacts said component over a relatively large surface area thereof and that has substantial mass, whereby said cradle serves as a heat sink to draw heat away from said component during said injection molding operation.

22. A vacuum regulator as defined by claim 1, wherein the upper portion of said housing and said solenoid are in the form of an encapsulation sub-assembly;

wherein said solenoid also includes a winding on said bobbin; and wherein said electrical circuit also includes terminal blades mounted on said bobbin and electrically connected to said winding, the mounted portions of said blades and the connections thereof with said winding being embedded in and sealed by said encapsulation.

* * * * *

UNITED STATES PATENT AND TRADEMARK OFFICE
CERTIFICATE OF CORRECTION

PATENT NO. : 4,567,910

DATED : February 4, 1986

INVENTOR(S) : Michael Slavin et al.

It is certified that error appears in the above-identified patent and that said Letters Patent is hereby corrected as shown below:

Column 2, line 37, "attracted" should be --attached--.

Column 2, line 44, "deetermined" should be --determined--.

Column 2, line 44, "value" should be --valve--.

Column 3, line 37, "currugated" should be --corrugated--.

Column 4, line 43, "suppot" should be --support--.

Column 4, line 53, "kep" should be --kept--.

Column 4, line 56, "advantageously" should be --advantageous--.

Column 6, lines 23 - 24, "encapsulated" should be --encapsulation--.

Column 6, line 43, "thos" should be --those--.

Column 6, line 53, "bobin" should be --bobbin--.

Column 7, line 25, "136" should be --126--.

Column 7, line 31, "socket" should be --sockets--.

Column 7, line 37, "tabe" should be --tab--.

Column 7, line 56, "socket" should be --sockets--.

Column 8, line 18, "preliminarly" should be --preliminarily--.

Column 9, line 27, "20b" should be --20B--.

UNITED STATES PATENT AND TRADEMARK OFFICE
CERTIFICATE OF CORRECTION

PATENT NO. : 4,567,910

DATED : February 4, 1986

INVENTOR(S) : Michael Slavin et al.

It is certified that error appears in the above-identified patent and that said Letters Patent is hereby corrected as shown below:

Column 9, line 61, "aramture" should be --armature--.

Column 9, line 64, after "point", insert --where--.

Column 10, line 3, after "armature", delete --and--.

Column 10, line 48, "of" should be --or--.

Column 11, line 5, "this" should be --the--.

Column 11, lines 64 - 65, after "collector", insert --plate--.

Column 15, line 28, claim 19, "hosing" should be --housing--.

Signed and Sealed this

Eighth Day of December, 1987

*Attest:*

DONALD J. QUIGG

*Attesting Officer* *Commissioner of Patents and Trademarks*